(12) United States Patent
Shpater

(10) Patent No.: US 9,123,222 B2
(45) Date of Patent: Sep. 1, 2015

(54) APPARATUS AND METHOD FOR DETECTING TAMPERING WITH AN INFRA-RED MOTION SENSOR

(75) Inventor: Pinhas Shpater, Haifa (IL)

(73) Assignee: NINVE JR. INC., Nassau (BM)

( * ) Notice: Subject to any disclaimer, the term of this patent is extended or adjusted under 35 U.S.C. 154(b) by 344 days.

(21) Appl. No.: 13/570,176

(22) Filed: Aug. 8, 2012

(65) Prior Publication Data

US 2013/0240739 A1 Sep. 19, 2013

Related U.S. Application Data

(60) Provisional application No. 61/611,515, filed on Mar. 15, 2012.

(51) Int. Cl.
| | |
|---|---|
| G01J 5/02 | (2006.01) |
| G08B 13/193 | (2006.01) |
| G02B 3/00 | (2006.01) |
| G08B 29/04 | (2006.01) |
| G02B 3/08 | (2006.01) |

(52) U.S. Cl.
CPC ............ *G08B 13/193* (2013.01); *G02B 3/0043* (2013.01); *G08B 29/046* (2013.01); *G02B 3/08* (2013.01); *Y10S 250/01* (2013.01)

(58) Field of Classification Search
USPC .................................. 250/338.1, 353, DIG. 1
See application file for complete search history.

(56) References Cited

U.S. PATENT DOCUMENTS

| | | |
|---|---|---|
| 4,429,224 A | 1/1984 | Wagli et al. |
| 4,442,359 A | 4/1984 | Lederer |
| 4,703,171 A | 10/1987 | Kahl et al. |
| 4,709,153 A | 11/1987 | Schofield |
| 4,728,794 A | 3/1988 | Allen |

(Continued)

FOREIGN PATENT DOCUMENTS

| | | |
|---|---|---|
| DE | 197 37 166 C2 | 4/2002 |
| EP | 0 499 177 A1 | 8/1992 |
| GB | 2470128 B | 5/2011 |

OTHER PUBLICATIONS

White Paper document F01U075615-01, Feb. 2008, by Bosch Security Systems, Inc, Fairport, NY, USA.

(Continued)

*Primary Examiner* — Christine Sung
(74) *Attorney, Agent, or Firm* — J-Tek Law PLLC; Jeffrey D. Tekanic; Scott T. Wakeman

(57) ABSTRACT

An infra-red motion detector for monitoring motion in a monitored space is described. The motion detector includes, within a housing, an infra-red radiation sensor sensitive to infra-red radiation incident through a window. A refractive optical system within the housing selects incident infra-red radiation for redirection onto the infra-red sensor. An external light source mounted externally of the housing directs external light through the window providing a recognizable light input. A refractive Fresnel patch mounted externally to the window selects incident light from the external light source and redirects it to a tamper sensor within the housing. A detection controller processes signals output by both sensors in monitoring the space. The detection controller detects incident light from the external light source and trips a tamper alarm in failing detection, and further detects changes in infra-red radiation in the monitored space and trips an intrusion alarm upon detecting changes.

24 Claims, 7 Drawing Sheets

(56) References Cited

U.S. PATENT DOCUMENTS

| | | | |
|---|---|---|---|
| 4,769,545 | A | 9/1988 | Fraden |
| 5,187,360 | A | 2/1993 | Pasco |
| 5,221,919 | A | 6/1993 | Hermans |
| 5,243,326 | A * | 9/1993 | Disabato ............... 340/555 |
| 5,308,985 | A | 5/1994 | Lee |
| 5,393,978 | A | 2/1995 | Schwarz |
| 5,418,368 | A | 5/1995 | Sandell et al. |
| 5,442,178 | A | 8/1995 | Baldwin |
| 5,453,622 | A | 9/1995 | Sandell et al. |
| 5,557,203 | A | 9/1996 | Nauerth |
| 5,831,529 | A | 11/1998 | Pantus |
| 5,877,499 | A | 3/1999 | Baldwin |
| 5,929,445 | A | 7/1999 | Barone |
| 5,942,976 | A | 8/1999 | Wieser et al. |
| 6,215,399 | B1 | 4/2001 | Shpater |
| 6,239,437 | B1 | 5/2001 | Barone |
| 6,324,008 | B1 | 11/2001 | Baldwin |
| 6,348,691 | B1 | 2/2002 | Sandell et al. |
| 6,377,174 | B1 | 4/2002 | Siegwart et al. |
| 6,469,625 | B1 * | 10/2002 | Tomooka ............... 340/556 |
| 6,529,129 | B1 * | 3/2003 | Tomooka ............... 340/556 |
| 6,690,018 | B1 | 2/2004 | Barone |
| 6,881,957 | B2 * | 4/2005 | Dougherty et al. ....... 250/338.3 |
| 6,921,900 | B2 | 7/2005 | Barone |
| 7,142,377 | B2 | 11/2006 | Hashimoto et al. |
| 7,375,313 | B2 | 5/2008 | Lee et al. |
| 7,459,670 | B2 * | 12/2008 | Lewin et al. ............. 250/221 |
| 7,474,477 | B2 | 1/2009 | Claytor |
| 7,635,846 | B2 | 12/2009 | Chi et al. |
| 8,451,135 | B2 * | 5/2013 | Carl, Jr. ............... 340/686.1 |
| 2005/0030180 | A1 | 2/2005 | Pantus et al. |
| 2007/0018106 | A1 | 1/2007 | Zhevelev et al. |
| 2007/0152156 | A1 | 7/2007 | Zhevelev et al. |
| 2008/0083868 | A1 | 4/2008 | Wipiejewski et al. |
| 2008/0272281 | A1 | 11/2008 | Stromberg et al. |
| 2009/0039296 | A1 | 2/2009 | Richard |
| 2009/0127465 | A1 | 5/2009 | Richard |
| 2009/0167538 | A1 | 7/2009 | Merritt et al. |
| 2009/0302222 | A1 | 12/2009 | Zhevelev et al. |
| 2009/0303069 | A1 | 12/2009 | Carl, Jr. |
| 2010/0164721 | A1 | 7/2010 | Pantus |

OTHER PUBLICATIONS

PCT/CA2013/050192 international search report with related claims 1-29, Jul. 9, 2013.

PCT/CA2013/050192 Written Opinion, Jul. 9, 2013.

\* cited by examiner

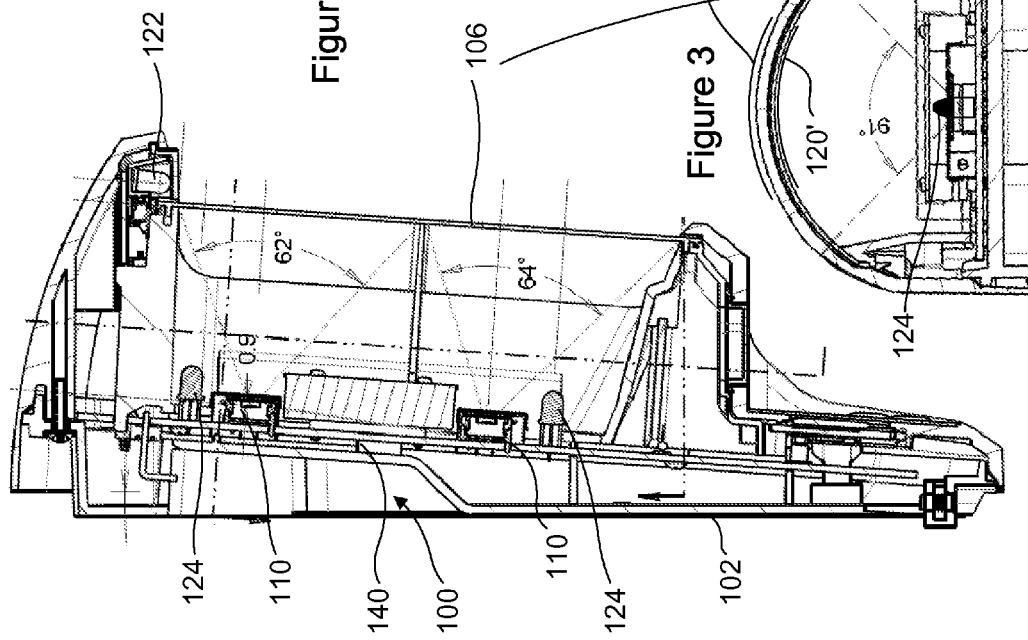
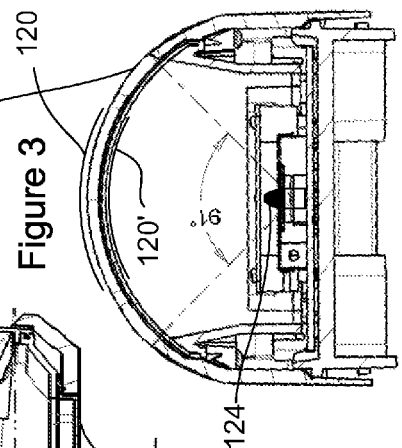
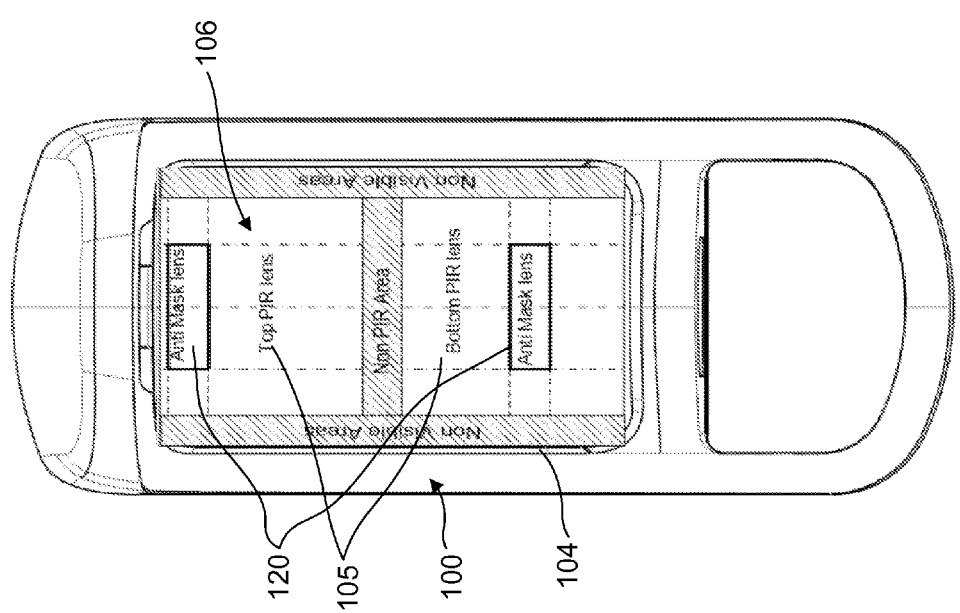

APPARATUS AND METHOD FOR DETECTING TAMPERING WITH AN INFRA-RED MOTION SENSOR

TECHNICAL FIELD

This invention relates to Passive infra-red (PIR) motion detectors and their lenses, as well as to apparatus and methods for detecting tampering therewith.

BACKGROUND

Passive Infra-Red (PIR) motion detectors, also referred to as intrusion or intruder detectors, are configured to detect movement of infra-red radiation emitted by the human body within a protected space. The human body typically gives off infra-red radiation at wavelengths ranging from 6 to 15 μm. Such a detector typically includes an infra-red sensor element and an array of Fresnel lenslets or mirrored segments window opening to focus incident infra-red radiation onto the sensor element. The optics collect IR light from specific zones within the protected space, and movement into and out of zones causes an amount of IR light detected to vary in time. A signal processing electronic component operates to process a signal output by the sensor element to detect an intrusion, and to trigger an alarm. In conventional PIR detectors, the sensor measures changes in IR light intensity and not the absolute level.

Anti Masking detection, using Active Near Infra Red (NIR, at the wave length of less than 1 μm) is an added technology to PIR detectors that monitors the PIR lens performance (i.e. PIR Lens transparency) and also may check the presence of close proximity objects (up to a distance of 1 m) for the purpose of alerting in case of unit optical masking. A review of some anti-masking technologies is found in White Paper document F01U075615-01, 2008, by Bosch Security Systems, Inc, Fairport, N.Y., USA. Causes can be due to blocking material applied on the unit lens surface intentionally, for the purpose of sabotaging the unit operation, unintentionally, such as a box placed near the unit lens, or degradation of the optics due to heavy accumulation of dirt or dust.

There are many types of Passive Infra-red blocking materials, however there are some materials which are substantially transparent at visual and NIR wavelengths but are opaque for infra-red wavelengths at which the human body radiates. For example, hair spray may be transparent at visual and NIR wavelengths but is opaque at PIR infra-red wavelengths. The problem is that a PIR motion detector can be deliberately sprayed from a distance with such a blocking substance, such as hair spray, which disables the unit operation by substantially attenuating the entrance of collected infrared light into the unit thus preventing it from detecting movements. Such visually transparent blockers may be sprayed during a period when the unit is unarmed, at a distance far enough from the unit so the proximity of the person or spray can will not be detected by the unit proximity protection, and after its application onto the lens surface, are hard to be noticed. Such material is also difficult to detect by a NIR lens transparency measurement since it may affect NIR light intensity by only a few percent.

Anti-Masking detectors are known in the art. In U.S. Pat. No. 7,884,313 and in US patent publication 2009/0302222, a waveguide optical structure is proposed that lies at the surface of a PIR lens to be able to detect when a coating is applied to the lens, since the coating will adversely affect TIR at the surface of the optical structure. These structures are separate from the Fresnel lenslet body of the PIR detector and require the use of additional dedicated pair of NIR light source and NIR sensor.

In U.S. Pat. No. 5,942,976, a light source is located external to the IR transparent detector window that encloses internal focusing optics, a large area diffraction grating is provided on the cover, and a light detector is provided inside the detector housing to sense the light from the light source. In U.S. Pat. No. 4,709,153, an external light beam is directed onto a sensor through an IR transparent window. Coating the cover with an IR opaque material can be detected by the absolute drop in light received at the light detector inside the housing. In EPO patent application publication 0499177, a wide external light beam is arranged to direct light onto an internal sensor for the external beam, such that coating of the Fresnel lens and placing a screen in front of the detector can be detected as a result of reflection of external beam light off the screen and into the detector.

SUMMARY

Applicant has discovered that one or more optical structures can be located and integrated onto a Fresnel lenslet body of a PIR detector, to re-direct low angle, active source light into the active source light receiver. The optical structure can perform with the advantage that more active source light is directed through the lenslet body to the light detector than compared to standard Fresnel lenslet body light pass-through, therefore it improves signal-to-noise of detected light and/or reduces active source power. Applicant has also discovered that when the optical structure contains elements on the external surface of the Fresnel lenslets body, there is a further advantage that a material sprayed on the external elements will affect refractive properties of the optical structure's light redirection and/or collection and thus enhance the detection of the sprayed material by detecting a much noticeable change in the detected light.

Applicant has also discovered that the same arrangement can be configured to detect all together proximity, masking and spray conditions, either by transmission attenuation due to PIR lens covering, due to spray affecting the refractive properties of the optical structure, or both, and by detecting also reflected light from a close proximity object. To use the same active source light detector that detects lens transparency to also detect proximity, In some embodiments, the active source light generates light in two or more different directions, one that is directed to the lens surface, and other that is directed to the unit's outer area. The two lights are generated at different timing and/or with different modulating frequency, thus enabling the common light detector to provide distinguished output signals . . . . Alternatively, other embodiments use a single wide angle source light that is directed to both lens surface and the outer area, in this case, an increase in received signal can represent proximity, while a drop in signal can represent masking.

Using a shared arrangement (sensor and optical structure) to detect both transparency, spray condition and proximity provides protection against masking of the proximity detection, compared to arrangements where the proximity detection is done using a separate sensor and/or window. Applicant has also discovered that integration of an anti-masking optical structure within the lenslet body between PIR lenslets does not adversely affect collection of IR light for motion detection. When anti-masking optical structure is partly or fully surrounded by PIR lenslets, it is more difficult to defeat the anti mask detection, as it is difficult to spray the surface of the PIR lens while not affecting the anti-masking optical structure. It is also possible to integrate more than one anti-masking optical structure area within the PIR lens body, thus making it even more difficult to defeat.

When the anti-masking structure is integrated into the PIR lens, a suitable location can be in the center of the lens body. In some embodiments, the ability to redirect external active source light onto the internal detector and the location of the internal active light source detector is also be factor in deciding where to locate the anti-masking optical structure.

Applicant discovered that the optical structures can be one or more Fresnel lenses, beam steering structures, diffusing or scattering texturing, prisms or micro-lenses. For example, providing a narrow strip of diffuser texturing on the outside of the PIR lens body at a location corresponding to between at least some PIR Fresnel lenslets on the inside of the PIR lens body, can be used to redirect active source light into the detector housing for detection. The area needed for the optical structure may reduce by a less than 10% the available aperture area for the PIR Fresnel lenslets. Also some or all of the optical structure elements can be implemented on the lens body outer surface and structured so as to be sensitive to the application of a liquid material to the PIR lens for masking detection purposes.

When the Fresnel lenslet body is molded, the inside surface can carry the Fresnel lenslets for focusing light from the zones onto the PIR sensor for motion detection, while the external surface can contain elements of the optical structures for the active source light, both being preferably formed during the same molding process. An anti-masking optical structure can contain optical elements on both sides of the PIR lens body, as for example, using optical elements on the outside that capture and redirect light from a low angle in combination with optical elements on the inside that focus the captured light onto a detector location inside the PIR detector.

The portion of the Fresnel lenslet body carrying the optical structure can be at separate locations from the portions carrying the PIR Fresnel lenslets. For example, external printed optical structure can be located between Fresnel lenslets printed on the internal side of the lens body.

The sensor for the active light source is preferably a light sensor separate from the main IR sensor for motion detection, however, using the main IR sensor can also be possible, provided that light source generates light at the sensor wavelength and at a frequency range within the sensor frequency response. Also special care has to be taken for distinguishing between test signals from actual detection, and limitation of test period to avoid blocking movement detection while being tested for anti masking.

Applicant has discovered that a plurality of optical structures located on different portions of the Fresnel lenslet body of a PIR detector can be advantageously used to direct portions of a beam of low angle, single active source light into the PIR detector at a plurality of detection locations. The portions can also be associated with different PIR motion optics and sensors, as is the case with a dual optics PIR motion detector.

Applicant has discovered that, in some cases, where it is difficult to locate the IR sensor in a direct view of the anti mask lens area, it is also possible to allow the active source light that have passed through the optical structure to reach the active IR sensor using an added internal reflector or a light guide.

Applicant has discovered that one or more optical structures located on the external surface of a Fresnel lenslet body of a PIR detector can cooperate with at least a portion of one or more internal PIR Fresnel lenslets provided on the inside surface of the lenslet body to direct low angle, active source light into the PIR detector. The external refractive structure can have a tolerable negative effect on the detection of IR light from the zones of the inside Fresnel lenslets.

BRIEF DESCRIPTION OF THE DRAWINGS

The invention will be better understood by way of the following detailed description of embodiments of the invention with reference to the appended drawings, in which:

FIG. 1 is a front view of a passive infra-red motion detector housing having a single Fresnel lenslets body with two Passive infra-red optics, external NIR light source, integrated anti mask optical structure and corresponding windows in accordance with an implementation of an embodiment of the proposed solution;

FIG. 2 is a side view cross-section of the embodiment of FIG. 1 showing also the internal PIR detectors and NIR sensors and their locations;

FIG. 3 is a horizontal cross-section of the embodiment of FIG. 1 passing through the top tamper sensor;

DETAILED DESCRIPTION

Figure 4:
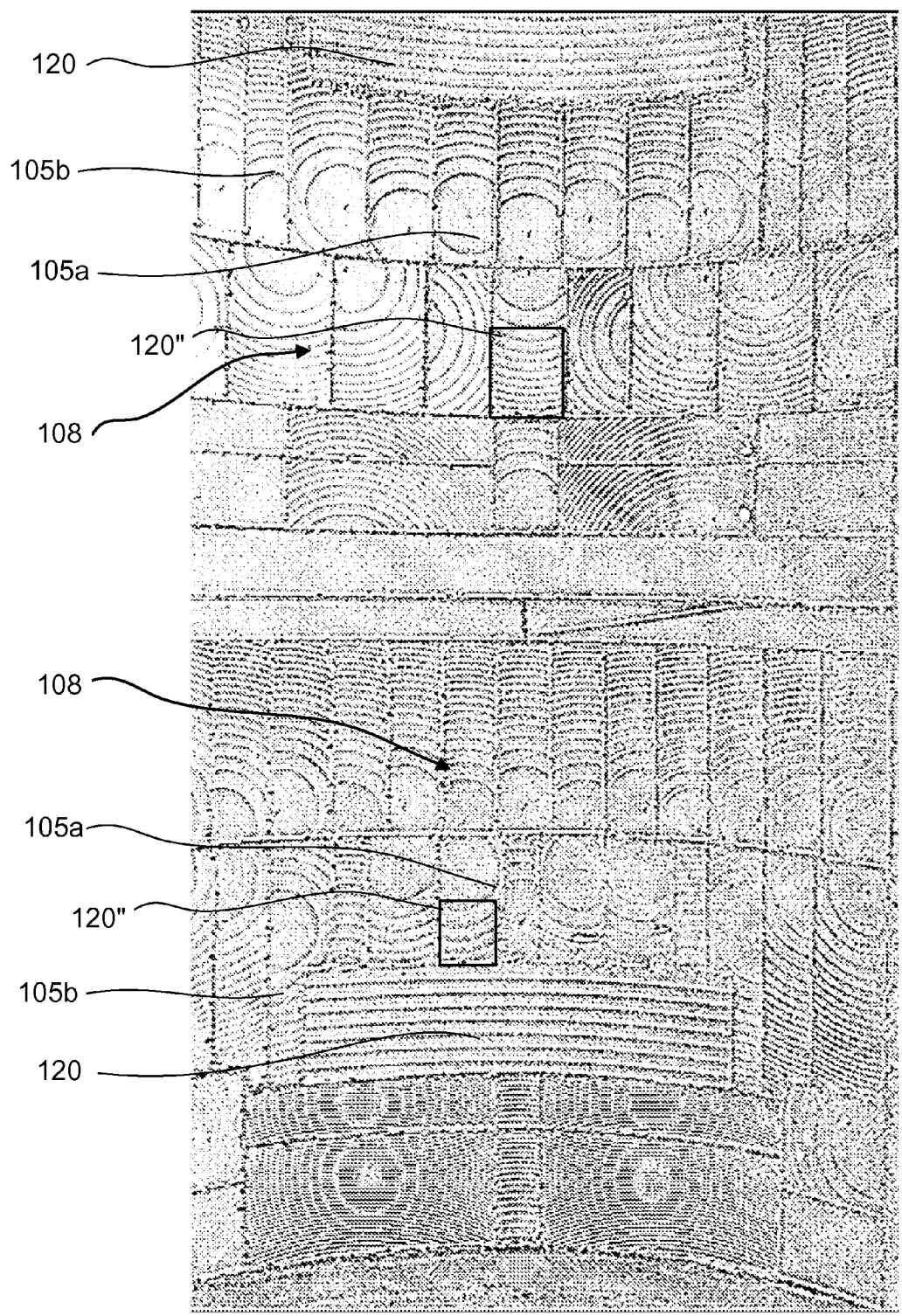
FIG. 4 illustrates a first lenslet pattern portion of an optical element for focusing incident infra-red radiation onto an infra-red sensor illustrated in FIG. 1, in accordance with the proposed solution.

A typical PIR motion detector has a housing with a front face in which a Fresnel lenslet body (also called a PIR lens) is mounted. The housing typically has a back panel that contains a circuit board on which the infra-red sensor and signal processing circuitry are mounted, and a front panel providing a mounting for the PIR lens. The housing usually provides also a closed cavity between the front and back panels, called bezels. The lenslets collect and direct human body infrared light onto the sensor. The typical PIR lens is a thin plastic sheet that is smooth on the outside and molded to have the lenslets usually printed on the side facing the inside of the housing. The flat sheet is bent to be somewhat cylindrically curved and mated to the housing. The PIR lens can also be directly molded into the desired shape, in some cases spherical. Typical PIR motion detectors thus have an inside and an outside. The PIR lens thus has an outside or external surface and an inside or internal surface. A typical PIR motion detector has a single IR sensor, however, dual optics (dual sensor and dual lens) PIR motion detectors are well known. It will be appreciated that a variety of PIR motion detector architectures are known in the art, and reference herein to specific arrangements of PIR motion detectors is not intended to limit the understanding that variations are also possible.

FIG. 2 illustrates a vertical cross-section through a dual sensor infra-red motion detector shown in FIG. 1 including external refractive optical structures on the Fresnel lenslet body 106. Infra-red motion detector 100, includes a housing 102 having window 104, namely the lenslet body. A dual optics PIR detector provide in generally more thorough coverage of a protected or monitored area, and the external refractive optical structures on the Fresnel lenslet body can also be applied to a single optics PIR detector.

Without limiting the invention, FIGS. 1 to 3 illustrate a multipart housing 102 which can be configured to snap, and/or configured to be fastened, together as a whole. However, housing 102 can be configured as a one piece housing having an opening which receives window 104. Without limiting the invention, window 104 can be configured as a single component of the housing motion detector 100, as shown in FIG. 1, providing a combination of housing opening cover and an optical element of an optical system used for example in refractively focusing incident radiation onto at least one sensor. FIG. 3 illustrates a horizontal cross-section through the motion detector 100 illustrated in FIG. 1, the opening into housing 102 being covered by window 104 having a separate optical element 106 configured to refractively focus incident radiation onto infra-red sensor 110.

While a convex window 104/optical element 106 is illustrated, the invention is not limited thereto, a flat or concave window 104/optical element 106 can also be used depending for example on the required geometry of the space to be monitored. On the inside of the lenslet body 104, Fresnel lenslet patches 105 are arranged.

When the lens body 106 is of a geometry, for example spherical, that does not allow for a single light source to project light onto all desired anti-masking patches 120, more than one source 122 can be arranged.

Without limiting the invention, FIGS. 1 and 2 illustrate a motion detector having two infra-red sensors 110. Motion detector 100 can include one or many passive infra-red sensors 110. FIG. 4 illustrates aspects of a lens optical element integrated in the separate optical element 106 of FIGS. 1 and 2. Without limiting the invention thereto, for the reminder of the description, the lens optical element is regarded as part of the separate optical element 106 and referred to as the lens optical element 106. FIG. 4 illustrates a first lenslet pattern 108 portion of the lens optical element 106 present in the optical path focusing incident infra-red radiation onto the top infra-red sensor 110 illustrated in FIG. 1. FIG. 4 illustrates a second lenslet pattern 108 portion of the lens optical element 106 present in the optical path focusing incident infra-red radiation onto the bottom infra-red sensor 110 illustrated in FIG. 1. The exterior of a conventional PIR window 104 having the lenslets printed or molded on the inside appears to the naked eye as smooth and opaque from the outside.

With reference to FIG. 2, in accordance with the proposed solution, the infra-red sensors 110 have corresponding angles of view in a longitudinal plane of the motion sensor 110. An extent of the angles of view in the transverse plane is illustrated in FIG. 3. Infra-red sensors 110 receive incident infra-red radiation from corresponding solid angles.

An example of a dual optics PIR detector is provided in U.S. Pat. No. 6,215,399, and need not be further described herein.

It is noted that the lenslet patterns 108 may cover more, same or less than the entire solid angle of view.

Without limiting the invention, lenslets of optical element 106 can be refractive, and can be either spheroidal/ovaloidal sections or refractive Fresnel type. The lenslet arrays can also be located on either inner or outer side of the optical element 106.

Figure 5:
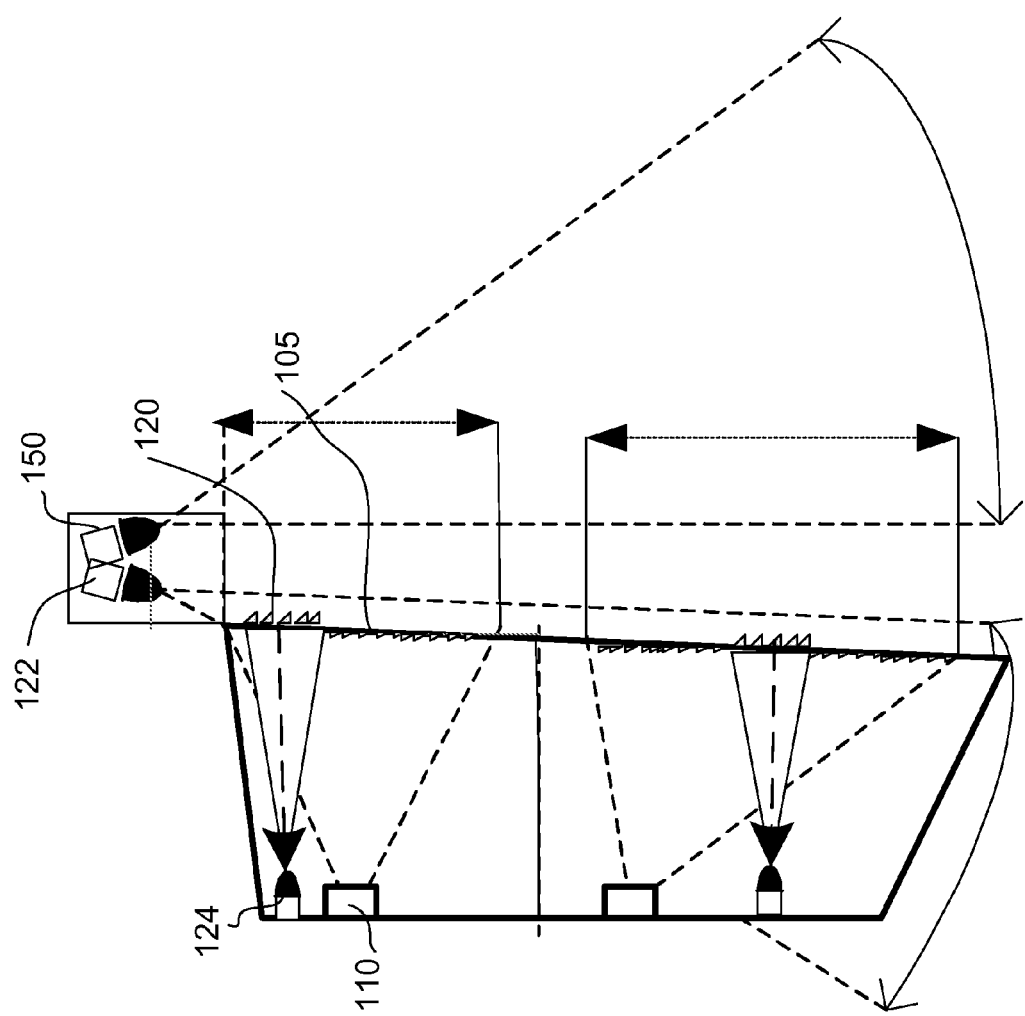
FIG. 5 is a schematic break-away side view of a dual passive infrared detector according to an embodiment in which external active light sources are directed both onto the anti-masking optical structure and also away from the PIR lens for detecting reflection against a blocking object.

In accordance with the present embodiment, window 104 or the combined optical element 106 is provided on its exterior with two refractive optical patches. FIGS. 1, 4 and 5 illustrate an optical patch 120 corresponding to each passive infra-red sensor 110. An external light source 122 illustrated in FIG. 5 is directed towards the window 104/optical element 106 at a low angle wherein the refractive patches 120 cause light from the external light source 122 to be redirected, at least in part, towards a corresponding optical tamper sensor 124. The external light source 122 can be integrated into the housing at the desired location as shown in FIG. 2, or it can be located on the circuit board on which the sensors 110 and a light guide guiding light from source 122 can be used guide light to a projection point outside said lenslet body.

Without limiting the invention, each optical patch 120 corresponds to a section of a straight prismatic lines as illustrated in FIG. 4, or a circular (with any radius) Fresnel refractive lens section. Other refractive optical patches or lenses having an oval, parabolic or hyperbolic shape can be used, for example depending on the (external) curvature of the window 104/optical element 106. For the external optical patch 120, the terms "refractive lenslets", "refractive patch" and "Fresnel patch" are intended to mean an optical structure that is able to capture light from the external source 122 and redirect it into the housing, whether this is achieved by lenslet refraction alone, by total internal reflection by prism elements, or by a combination of both.

Without limiting the invention, directing the external source 122 light towards the corresponding optical tamper sensor 124 the refractive power of optical patch 120 can be augmented by the refractive power of the Fresnel PIR lenslets in corresponding lenslets arrays on the inner side of the optical element 106 (as shown in FIG. 5). That is, in some implementations at least one of the refractive Optical patches 120 is positioned such that a light beam from the external light source 122 is refracted towards the corresponding light tamper sensor 124 passes in at least one of the gaps between the lenslets in the corresponding array. In other implementations at least one of the refractive optical patches 120 is positioned such that a light beam from the external light source 122 is refracted towards the corresponding light tamper sensor 124 passes through at least one of the PIR Fresnel lenslets in the corresponding array. In these latter implementations, the at least one lenslet in the array need not necessarily be one of the lenslets 108 defining the motion detection beams but special purpose lenslets 108 for refracting light from the external light source 122. The refractive optical patch 120 need not be contiguous or of a simple overall shape such as the rectangular patch illustrated in FIGS. 1 and 4.

When the lens body 106 has a circular cross-section at a patch 120, the directing of anti-masking light from the patch 120 to the detector can be partly directed by the circular geometry that points toward the sensor 124 along its circumference. Better focusing can be achieved using an additional Fresnel structure 120' (see FIG. 3 and not shown in FIG. 4) on the inside of the lens body 106. This also applies when the lens geometry is not circular.

The patch 120 can comprise a whole or a portion of a PIR Fresnel lenslet 105 that is printed or molded on the outside of the lens body 106 and is suitable to redirect the active source light onto a tamper sensor 124 inside the housing. In general, it is Practical to have the PIR lenslets on the inside of a PIR lens to avoid degradation of optical efficiency by the accumulation of airborne particulates (dust, dirt, grease, etc.). However, the location of a portion of the PIR lenslets 105 on the outside to serve also as the patch 120", as illustrated in FIG. 4, can provide the function of efficient redirection of low angle active light source light onto a tamper sensor and detection of a sprayed or applied liquid. It will be noted that the shape of the outer area of a Fresnel lenslet resemble the shape suitable for the specified optical structure 120". The location of the tamper sensor 124 will be determined by the actual location of the Fresnel lenslet and the active source. Locating the light sensor on the main circuit board of the detector will be possible in many circumstances by the choice of the patch 120" location and the location and beam pattern of the source 122.

In accordance with some embodiments of the proposed solution, optical tamper sensors 124 are in addition to passive infra-red sensors 110. In accordance with these embodiments, tamper sensors 124 need not be limited to infra-red radiation in the human body emission range of 6 to 15 μm and can therefore operate independently of passive infra-red sensors 110. Preferably, optical tamper sensors 124 do however need to be sensitive to wavelengths which are also blocked by the same blocking materials which block infra-red wavelengths in the human body emission range of 6 to 15 μm. For example the external light source 122 and optical tamper sensors 124 can respectively emit and be sensitive to light having a wavelength content in the 850-900 nm range. The wavelength gap between the infra-red sensors 110 and the optical tamper sensors 124 permits concurrent continuous operation thereof without interference, however concurrent continuous operation thereof is not required. The tamper sensor 124 can use a photodiode, phototransistor or any other suitable light detector element. In operation, if light tamper sensors 124 detect an absence, or a dimmed amount, of light falling thereupon, an alert signal is tripped possibly also signaling probable tampering with the motion sensor 100. The use of additional light tamper sensors 124 in addition to infra-red sensors 110 does represent additional manufacturing cost, and it is not unthinkable that blocking materials may be developed which selectively block the infra-red light sensed by the infra-red sensors 110 while being transparent to wavelengths sensed by the light tamper sensors 124 (such as described earlier: hair spray which blocks 90% of PIR range but reduces only by 6% the NIR signal). None such selective blocking materials are apparent.

In accordance with another embodiment, optical tamper sensors 124 can be the infra-red sensors 110. In accordance with this other embodiment, external light source 122 either emits light in a wavelength range at least partially overlapping infra-red radiation in the human body emission range of 6 to 15 μm, or the sensors 110 are also sensitive to the wavelength, e.g. near infra-red, emitted by the external light source. Motion detection and tamper detection can be coordinated for example by employing filtering and/or by a time sharing scheme and/or by an active source signal generated at DC or a frequency which is out of typical movement frequency with respect to the utilization of the infra-red sensor 110. For example the external light source 122 can be modulated on and off in a deterministic or non-deterministic pattern. In operation if light sensor 110 detects an absence, or a dimmed amount, of light falling thereupon during time periods when the external light source 122 is commanded on or detected to draw power/current, the alarm is tripped possibly also signaling possible tampering with the motion sensor 100.

The use of infra-red sensors 110 for both motion detection and tamper detection (i.e. without using separate detectors 124 for tamper detection) enjoys reduced manufacturing and unit costs overhead. Additionally, as long as the active source operates in a manner that is compatible with the sensor 110 and tamper detection, without interfering with motion detection, the use of a single detector for tamper detection is desirable.

Figure 9:
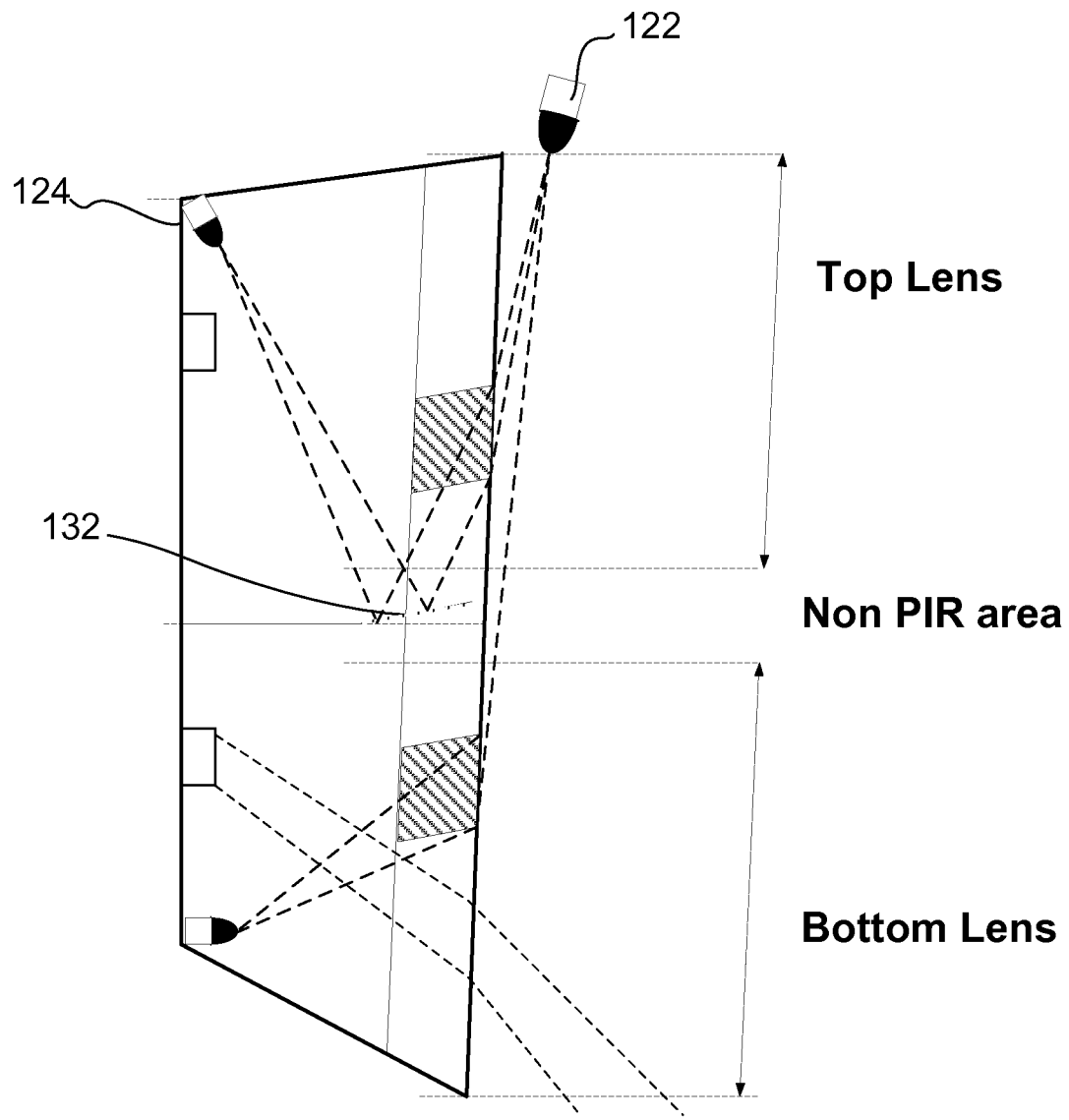
FIG. 9 is a schematic break-away side view of a dual optics passive infrared motion detector in which an external light source passes through and redirected by anti-masking patches, and is further reflected by an internal reflector onto one of the sensors, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

The invention is not limited to exclusive refractive redirection of light from the external light source 122 directly into a tamper sensor 104/110, if the mechanical design prevents a direct path from the optical structure to the tamper sensor, a redirected light path can use an internal mirrored surface or other light guide technical for additional redirecting the light beams from the already passed through and redirected external light source onto the appropriate tamper sensor. An example of this is illustrated in FIG. 9. A mirror 132 reflects light passing through the top lens body onto the detector 124. The optical structure patch in this case redirects the light passing through the lens body to a mirror surface area 132. The mirror 132 then further redirects and reflects the light on the inside of the housing onto the sensor, and optionally, the mirror 132 can collect additional light and focus the reflected light onto the detector 124.

A detection controller located on PCB 140 (see FIG. 2) processes signals output by both sensors 110/124 in monitoring the space. The detection controller detects incident light from the external light source and trips a tamper alarm in changes or failing detection, and further detects changes in passive infra-red radiation in the monitored space and trips an intrusion alarm upon detecting changes. Tamper detection can be performed using a separate circuit or processor than intrusion detection, or in the same circuit or processor. Without limiting the invention, the alarm can be installed at a location remote from the motion detector 100. In embodiments in which light from the external light source 122 is modulated, thereby generating a recognizable/detectable signal such as, but not limited to, a continuous stream of pulses. The detection controller 140 is configured to recognize the signal and under normal circumstances ignore its presence or filter it out, but on the other hand to recognize its absence.

FIG. 5 shows an embodiment having a NIR LED optics 150 that projects external light in front of the detector with a view to detect the presence of an object close to the PIR lens. When an attempt is made to mask or otherwise tamper with the detector, NIR light reflected by the object from the beam emitted by source 150, enters the PIR lens and is detected internally by the NIR tamper sensor. Alternatively, a NIR tamper detector can be located separately with its own window opening, however, this may be vulnerable to masking or tampering. It will be appreciated that using the NIR sensor that monitors the lens transparency to also detect proximity reflected NIR signal passing through the already monitored PIR lens body serves to also protect the proximity tamper detection ability of the unit. Reflected light from the front of the detector can enter generally through the whole of the PIR lens body, passing through the anti-masking optical structure 120 region, the PIR Fresnel lenslet region and any blank region can, even if diffusely.

The anti-masking optical structure patch 120 can be located as shown in FIGS. 1 and 4 in the middle of a top row of Fresnel lenslets 104. The patch 120 is on the front exterior side, while the lenslets 105 are on the interior side. The detection sensitivity in the middle is preferred than at the outer sides because it provides good anti-mask protection using only a single optical structure patch.

In FIG. 5, the same single NIR detector 124 (per PIR lens section) is used to detect the proximity reflected NIR light, although it would be possible to use additional different detector. In the embodiment of FIG. 5, the detectors are positioned to receive light from LED 122 redirected by the optical patches 120. To use a single detector 124 for anti-masking and for proximity detection, the LED's 122 and 150 can be actuated at different times or using different frequencies so that a common detector can distinguish between anti-masking and proximity. When different frequencies are used, signal filters can be used to filter the signal from detector 124 to produce a signal specific to the returned and detected light from LED 122 or LED 150. This correlation of source and detector modulation frequencies also allows for background signals to be essentially removed, particularly when a narrow bandpass filter is used. The frequency of modulation can be any suitable frequency, for example around 1 kHz, when using two frequencies, distinct frequency values for the different light sources can be chosen. The frequency of modulation need not be fixed if the filter frequency is adaptable or adjustable. When the PIR detector has signal processing capabilities, one can also filter and analyze the signal. In this way, signal detected can be filtered by correlation to the signal transmitted and accumulated to further filter out irregularities and uncorrelated signals and noise. Preferably, modulation of the light source can be done by modulating an electric control signal, however, an optical shutter or chopper can alternatively be used.

When using the unit in outdoor conditions, water resistance needs to be addressed. The external surface and dimensions of the optical structure 120 as illustrated in FIGS. 4 and 5 have suitable dimensions and surface finish properties to avoid retaining water when the detector is exposed to mist or water droplets, and is thus suitable for outdoor use. Retaining water within the grooves of the structure 120 can reduce the ability to detect hair spray condition and/or result in a false detection of masking.

In FIG. 5, the anti-masking source 122 is used to project light onto both of the optical structure patches 120. As can be appreciated, the amount of light reaching the lower patch that is much further from the source 122 is lower than the upper patch. If desired, a separate source for the lower patch that is located nearer to the lower patch. Alternatively, the patch area of the lower patch could be larger (or seen differently, the upper patch can be smaller) to balance the signal received from the two patches. Alternatively, this can also be adjusted electronically by using different gain levels for each channel.

Figure 6:
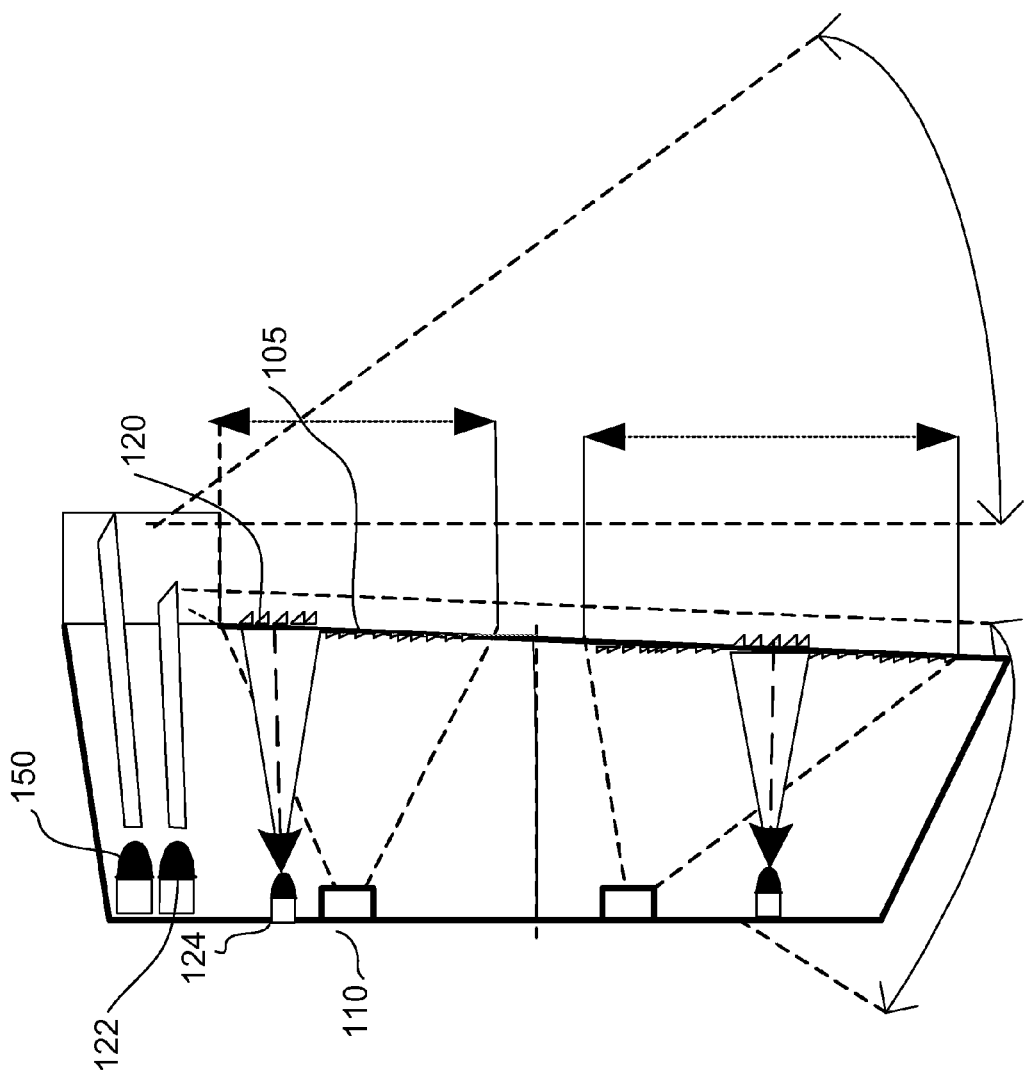
FIG. 6 is a schematic break-away side view of a dual passive infrared detector according to an embodiment in which light from an internal active light source is directed externally using light guides both onto the anti-masking optical structure and also away from the PIR lens for reflection against a blocking object.

In FIG. 6, the active sources are located on a circuit board of the detector, and light guides are used to direct their light to the desired external projection location. This can be more convenient in manufacturing to have the LED's located on a same single circuit board with other electronic components.

Figure 7:
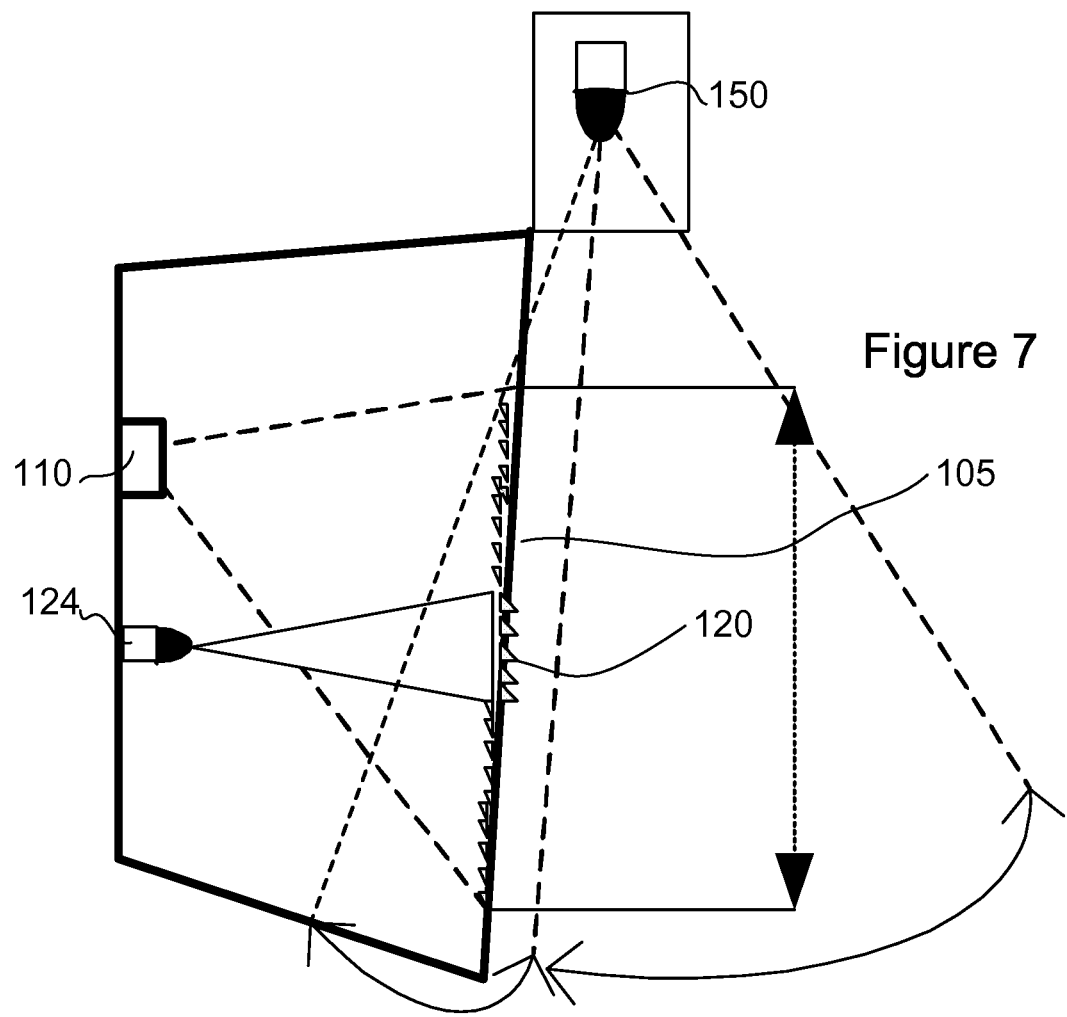
FIG. 7 is a schematic break-away side view of a single passive infrared detector according to an embodiment in which a single external active light source is directed both onto the anti-masking optical structure and also away from the PIR lens for reflection against a blocking object.

While the embodiment of FIG. 5 uses different sources for anti-masking and proximity, it will be appreciated that a single active source can be used, as shown in FIG. 7. Any increase in light detected can be considered the result of proximity tampering, while a drop in light detected can be considered the result of masking. A wide beam can be used from a single source, or a lens can be adapted to provide a beam portion for transparency and a beam portion for proximity detection.

In the embodiment of FIG. 7, a single IR sensor PIR detector is illustrated in which the anti-masking optical structure patch 120 is located centrally on the PIR lens. The NIR LED 122 provides a wide beam useful for proximity detection and for anti-masking detection.

Figure 8:
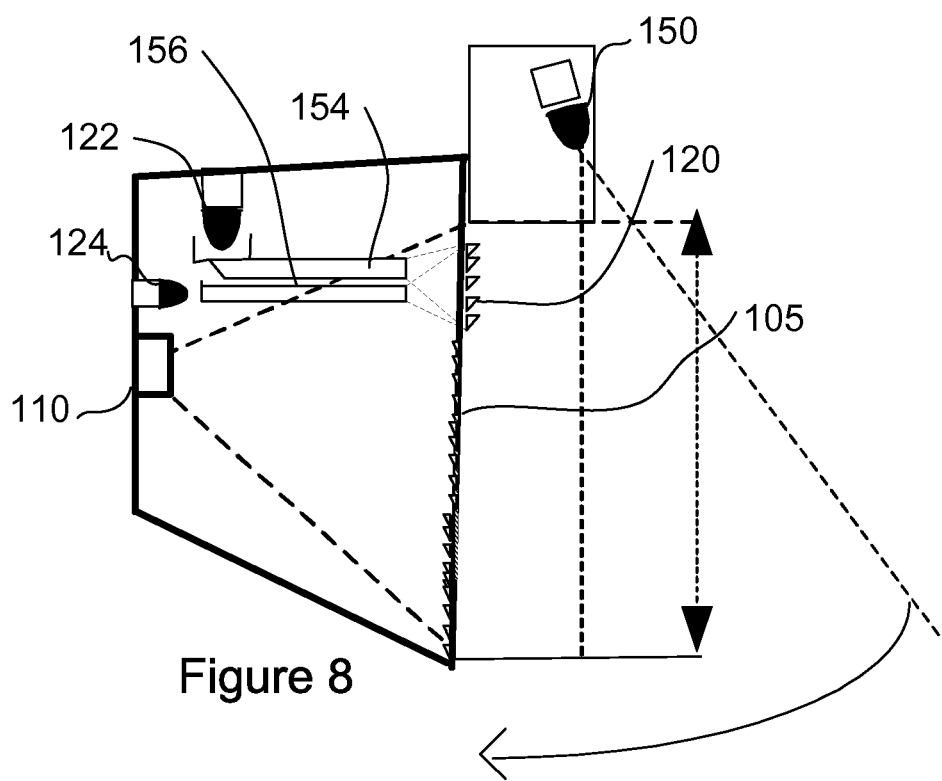
FIG. 8 is a schematic break-away side view of a single passive infrared detector according to an embodiment in which an external active light source is directed away from the PIR lens for reflection against a blocking object, while an internal active source is directed by a light guide to an inside surface of the PIR lens where an external anti-masking optical structure is located.

In the embodiment of FIG. 8, the anti-masking optical structure patch 120 is integrated into the PIR lens body and used in conjunction with an internal active source. In this embodiment, the optical structure of the patch 120 is not designed to redirect low-angle light into the cavity toward the detector 124. Instead, the patch 120 provides a level of retroreflection that is changed when covered with a spray. The internal source 122 can be combined with a light guide 154 to facilitate delivery of light to the inside of the PIR lens corresponding to the patch 120, or the light can be directed to the patch without a light guide. The detector 124 likewise can use a light guide 156, or simply detect light returned from the patch and from other areas of the PIR lens body. Persons skilled in the art will understand that various arrangements of light sources and any light guides to effectively detect the change in optical properties of the external patch 120 using a source and detector located inside the PIR detector are possible. This embodiment avoids using an external source for anti-masking detection, and this can be seen as desirable for the simplicity and elegant appearance of the PIR motion detector housing, however this arrangement is less preferred as it has difficulties in detection of masking condition created by a light absorbing material (such as a black electrical tape).

Furthermore, the lens can act to transmit the source light to the outside, and then pass it through back to the unit in case of an external object with proximity to the unit. In this way, both integration of the anti-masking lens within the PIR lens and the ability to use the same light source and same detector for proximity detection are achieved The detection of proximity tamper light can be done using the same sensor as for anti-masking or using a different sensor located to receive light reflected from a proximate object and then passing through the PIR lens. However this arrangement is less preferred as it requires detecting a narrower change in the received reflected light, as well as having difficulties to detect a masking condition by light absorbing materials.

The detection of masking can have three components, the portion of light detected that passes through the anti-masking optical structure patches 120, the portion of light from source 122 transmitted through a remainder of the lens body 106 (when this source is external), and the portion of light reflected from a blocking object from source 150. While only two sources 122 and 150 are described in the above embodiments, it will be appreciated that in some cases a single source can be used, and multiple independent sources can be used in other cases. When the sources are distinguishably detectable, a better understanding of the trouble condition can be determined.

As can be appreciated, the light directed onto the optical structure patch 120 from the inside of the PIR detector is done in a way that does not interfere with the function of the lenslets 104 collecting and directing IR light onto sensor 110. In the embodiment of FIG. 8, even if proximity detection is not included, better protection against masking is provided by having the anti-masking optical structure patch located within the matrix of Fresnel lenslets 105 on the PIR lens body 106 instead of outside of the lens body. Furthermore, more than one optical structure patch 120 can be provided to make it more difficult to attempt to mask the Fresnel lenslets while not masking the patches 120 and provide better monitoring of the entire PIR lens.

It is also possible to reverse the direction path so light could travel from the inside to the outside, for example: The anti-masking light source 122 can be located inside the housing, the anti-masking detector 124 could alternatively be mounted outside the housing, for example, next to the source 150.

The source 124 as described above is a near infra-red LED. This wavelength is chosen because it is close to the PIR infra-red, the wavelengths involved in motion detection. It will be appreciated that when the optical structure 120 undergoes a large change in its optical properties not so much due to absorption of light resulting from the application of a spray substance but due to changes in refraction or reflection properties resulting from grooves being filled and coated by the spray substance, the wavelength of the light used to detect the spray is less important. Though less desirable, it is possible to use other suitable wavelengths, for example a visible wavelength could be used. A source of far infrared light, such as a heated radiating element can also be used, and modulation of its intensity would normally require an optical shutter or chopper to obtain generation of high frequency.

The invention is not confined to the precise details of the foregoing example implementations, and variations may be made thereto. Thus, for example, the external source 122 does not have to be integrated with or be provided on the housing 102, but can be provided as a separate individual component or unit mounted in an appropriate location away from the motion detector 100.

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. An infra-red motion detector Fresnel lenslet body comprising:
  an array of Fresnel lenslets provided on said Fresnel lenslet body, each of said Fresnel lenslets corresponding to a motion detection zone for collecting and focusing light onto a passive infrared sensor target, said array of Fresnel lenslets being provided on a first side of said body to act as internal side Fresnel lenslets; and
  at least one anti-masking optical structure provided on said Fresnel lenslet body within said array of Fresnel lenslets, said at least one anti-masking optical structure having an optical property that changes in the presence of a masking material, said at least one anti-masking optical structure is provided on a second side of said body to act as at least one external side anti-masking optical structure.

2. The lenslet body as claimed in claim 1, wherein said anti-masking optical structure comprises at least one patch of refractive lenslets configured to capture light incident on said second side at a low angle from an active light source and redirect light to said first side.

3. The lenslet body as claimed in claim 2, wherein said patch of refractive lenslets do not participate in said collecting and focusing light onto said passive infrared sensor target.

4. The lenslet body as claimed in claim 2, wherein said patch of refractive lenslets participate in said collecting and focusing light onto said passive infrared sensor target.

5. The lenslet body as claimed in claim 1, wherein said anti-masking optical structure comprises at least one external side structure for capturing incident light and at least one corresponding internal side structure for focusing captured light onto a sensor location.

6. The lenslet body as claimed in claim 1, wherein said anti-masking optical structure comprises one or more patches.

7. The lenslet body as claimed in claim 1, wherein said lenslet body is essentially smooth on said second side except for said anti-masking optical structure.

8. The lenslet body as claimed in claim 1, wherein said at least one optical structure is at least partly inset within said internal side Fresnel lenslets on said body.

9. The lenslet body as claimed in claim 8, wherein said optical structure occupies a central portion of a row of said internal side Fresnel lenslets.

10. The lenslet body as claimed in claim 1, wherein said at least one optical structure is located on said body between two or more of said Fresnel lenslets.

11. The lenslet body as claimed in claim 1, wherein said at least one optical structure is located on said body to be surrounded by said Fresnel lenslets.

12. The lenslet body as claimed in claim 1, wherein said passive infrared sensor target comprises is a single PIR sensor target, said Fresnel lenslets are configured for collecting and focusing light onto said single PIR sensor target.

13. The lenslet body as claimed in claim 1, wherein said Fresnel lenslets are configured for collecting and focusing light onto two PIR sensor targets.

14. The lenslet body as claimed in claim 1, wherein said at least one anti-masking optical structure is configured to resist water retention by said optical structure.

15. A passive infrared (PIR) motion detector comprising:
  a lenslet body as claimed in claim 1;
  a housing having said lenslet body mounted thereon;
  at least one passive infra-red radiation sensor within said housing substantially opposite said lenslet body to receive IR light collected from said zones, said infra-red sensor being sensitive to infra-red radiation wavelengths including infra-red radiation wavelengths emanated by a human body;
  at least one active light source for projecting light onto said anti-masking optical structure; and
  at least one tamper sensor for detecting said light source light redirected from said anti-masking optical structure.

16. The PIR detector as claimed in claim 15, wherein said active light source is configured to project proximity detection light in front of said lenslet body, and said tamper sensor is configured to detect proximity detection light reflected from an object placed near said lenslet body.

17. The PIR detector as claimed in claim 16, wherein said active light source comprises at least one anti-masking light source directed onto said anti-masking optical structure and at least one proximity light source directed in front of said lenslet body to provide said proximity detection light.

18. The PIR detector as claimed in claim 17, wherein said anti-masking light source and said proximity light source are driven at different modulation frequencies.

19. A passive infrared (PIR) motion detector comprising:
  a. an infra-red motion detector Fresnel lenslet body comprising:
    i. an array of Fresnel lenslets provided on said body and corresponding to motion detection zones in a monitored space for collecting and focusing light onto a passive infrared sensor target; and ii. at least one anti-masking optical structure provided on said body, b. a housing having said lenslet body mounted thereon;
c. at least one passive infra-red radiation sensor within said housing substantially opposite said lenslet body to receive IR light collected from said zones in said monitored space, said infra-red sensor being sensitive to infra-red radiation wavelengths including infra-red radiation wavelengths emanated by a human body;
d. at least one active light source for projecting light onto said anti-masking optical structure; and
e. at least one tamper sensor for detecting said light source light redirected from said anti-masking optical structure, wherein said active light source is configured to project proximity detection light in front of said lenslet body, and said tamper sensor is configured to detect proximity detection light reflected from an object placed near said lenslet body.

20. The infra-red motion detector Fresnel lenslet body as claimed in claim 1, wherein said Fresnel lenslet body comprises a sheet portion and wherein said array is formed on said sheet portion.

21. The infra-red motion detector Fresnel lenslet body as claimed in claim 1, wherein said optical property is refraction.

22. An infra-red motion detector Fresnel lenslet sheet comprising:

an arrangement of Fresnel lenslets formed in at least one surface of the lenslet sheet, each of said lenslets corresponding to a motion detection zone for collecting and focusing light onto a passive infrared sensor target, wherein, the at least one surface of the Fresnel lenslet sheet includes at least two projecting surface portions separated by a gap, the at least two projecting surface portions and the gap being configured to refract a beam of light from outside the detector to inside the detector in a first manner when the gap is filled with a masking material and to refract the beam of light from outside the detector to inside the detector in a second manner different than the first manner when the gap is filled with ambient air such that the at least two projecting surface portions and the gap form an anti-masking optical structure.

23. The infra-red motion detector Fresnel lenslet sheet as claimed in claim 22, wherein the at least two projecting surface portions are located between a first lenslet and a second lenslet of said arrangement of Fresnel lenslets.

24. The infra-red motion detector Fresnel lenslet sheet as claimed in claim 22, wherein the at least two projecting surface portions are surrounded by a plurality of the Fresnel lenslets.

* * * * *